United States Patent Office 3,306,702
Patented Feb. 28, 1967

3,306,702
REMOVAL OF METAL SALT CONTAMINANTS
FROM ACIDIC AQUEOUS LIQUIDS
Karsten Odland, La Grange, and Reed S. Robertson, Glen Ellyn, Ill., assignors to Nalco Chemical Company, Chicago, Ill., a corporation of Delaware
No Drawing. Filed June 18, 1962, Ser. No. 202,991
5 Claims. (Cl. 23—165)

This invention relates to an improvement in an ion exchange technique for the removal of metal salt contaminants from acidic aqueous liquids. Particularly, the invention is directed to a method for improving the removal of metal salts dissolved in highly ionized acids by using acid retardation techniques.

It is now known that strong-base anion exchange resins when used in a particular fashion are capable of removing metal salts which contaminate relatively strong solutions of strong acids. This technique is most commonly called acid retardation.

The process in its simplest form utilizes a strong-base anion exchange resin of the type disclosed in U.S. Patents 2,591,573 and 2,614,099. At the beginning of the treatment, the anion exchange resin is placed in a salt form corresponding to the anion of the strong acid being purified.

If a column technique is employed, a fraction of the bed volume of the acid is fed to the anion exchange resin. This feed is followed by a water "regenerant." The result of these two operations provides effluent fractions which are initially rich in salts and lean in the acid being treated, and other fractions which are relatively rich in the acid and dilute in the salts.

The operation is usually conducted sequentially and continuously with numerous fractions being collected. The salt-rich fractions are normally collected separately and a portion thereof recycled to the feed for subsequent treatment by the resin, whereas the acid rich fractions are recovered and used as purified acid.

It is obvious that to be commercially operative there must be substantial differentiation between the salt-rich and acid-rich fractions.

As indicated, if there is not good delineation between the salt-rich and acid-rich fractions, separations must be carefully made and the economics of the process tend to be somewhat limited. There is particular difficulty in obtaining wide band spreads between the salt-rich and acid-rich fractions. In many cases this is attributable to precipitation of the metal salts upon or within the ion exchange resin. These precipitates usually occur due to a diminution of the acidic environment in which the salt is substantially soluble. This precipitation factor does not always occur and is dependent upon the particular type of salt treated, the acid media in which it is dissolved and the subsequent change of acidic environment. The purification of crude phosphoric acid contaminanted with iron salts presents a particularly bothersome separation; as the phosphoric acid is selectively adsorbed within the resin bead, with the salts being excluded and concentrated in the void volumes about resin, the decrease in acidity of the voids solution causes the iron salts to precipitate on and within the resin. When the subsequent water regenerant wave is applied to the bed to elute the adsorbed acid, the increase in acidity of the voids solution redissolves previously precipitated iron salts and contaminates the purified product. Other heavy metals, as well as some alkaline earth metals, tend to precipitate during an "acid retardation" cycle.

If it were possible to overcome the precipitation effect which occurs during the operation of some acid retardation processes, substantial improvement in the operation of the process would be effected. Similarly, if it were possible to obtain maximum displacement between the salt-rich and acid-rich product waves, greater versatility would be afforded the process so that acids normally not amendable to acid retardation purification could be effectively treated. A second advantage would be the realization of a larger percentage of highly purified acid per cycle, with substantially less recycle of partially purified acid to the influent feed.

It is an object of this invention to provide a method for improving the operational efficiency of acid retardation processes used to purify strong acids.

A specific object of the invention is the prevention of precipitation of certain metal salts upon or within ion exchange resins used to practice acid retardation processes.

A further object of the invention is to improve the overall efficiency of acid retardation operations by using simple chemical expediencies and without materially altering conventional acid retardation cycles. Other objects will appear hereinafter.

In accordance with the invention, it has been found that acid retardation processes may be substantially improved, particularly where precipitation of certain metal salts tends to occur in and upon the surface of the anion exchange resin, by conducting the process in the presence of a complexing agent at the time when the strong acid containing salts impurities comes in contact with the strong base anion exchange resin. Specifically, the invention resides in the treatment of these strong acid solutions with at least 100 parts per million of a complexing agent which may be either a hydroxy carboxylic acid complexing agent or a condensed phosphate.

An important aspect of the invention resides in the pre-treatment of the strong acidic solution containing dissolved therein metal salts which tend to precipitate upon diminution of the acidic environment just prior to passage through the anion exchange resin. This is particularly important when condensed phosphate complexing agents are used. The reason for such treatment immediately prior to contacting the strong acid solutions with the anion exchange resin is that condensed phosphates tend to revert to orthophosphates and become substantially inoperative, so far as their complexing ability in the acid retardation process is concerned, with extended aging.

The amount of complexing agent used in the invention may be as little as 100 parts per million, although in the case of the condensed phosphates usually from 200 to as much as 200,000 parts per million may be used. Similar amounts of complexing agent are necessary when the hydroxy carboxylic acid complexing agents are employed.

The hydroxy carboxylic acid complexing agents that may be employed in the practice of the invention are well-known materials, frequently derived from certain saccharides and polysaccharides; particularly effective hydroxy carboxylic acids are citric, gluconic, glucoheptonic, as well as the other well-known hydroxy carboxylic acids formed by reaction of sugars with alkali metal cyanides or with hydrocyanic acid, with subsequent hydrolysis to produce the corresponding sugar carboxylic acids.

For a more complete description of the well-known hydroxy carboxylic acid complexing agents, reference may be had to the text, "Organic Sequestering Agents," by Stanley Chaberek and Arthur E. Martell, John Wiley and Sons, New York, 1959.

As previously indicated, the invention is particularly valuable in treating those strong acids which contain metal salts that tend to precipitate in low acidity media or in the presence of the strong-base anion exchange resin. This is particularly true of such acidic solutions as phosphoric acid, sulfuric acid, and the like which have contained therein either alkaline earth metal or heavy metal salts the anion of which corresponds to the anion of the acid.

Iron salts present a particularly severe problem when present in phosphoric acid solutions; when acid retardation is practiced for removal of iron salts from impure phosphoric acid solutions, resin fouling frequently occurs due to the precipitation of iron phosphate. This undesirable precipitation reduces the sharpness of the collectable fractions thereby necessitating sharp fractionation procedures to effectively separate relatively pure (salt-free) acid from the process, reduces the amount of purified acid obtained from the cycle, and increases the volume of partially purified acid which must be recycled.

By utilizing the complexing agents, however, it is possible to improve the overall efficiency of acid retardation of phosphoric acid solutions contaminated with iron salts, thereby providing greater, high purity yields thereby reducing the care required in the fractionation of the various effluents obtained by the process, and minimizing the recycle volume.

A specific phosphoric acid solution frequently contaminated with iron salts is the agricultural grade obtained by sulfuric acid treatment of phosphate rock. These acids are most commonly used to produce fertilizer-grade phosphates. However, if they could be substantially freed from metal salt contaminants, the upgraded products would be of more value, since they could then be sold as technical grade phosphoric acid. The major contaminant in these solutions is iron and aluminum phosphates. To up-grade their purity it is necessary that both iron and aluminum be removed. When such acids are treated by conventional acid retardation processes, separation of aluminum salts is readily obtained, but iron salts tend to precipitate on the resin as iron phosphate, thereby diminishing the effectiveness of the process. By treating such acid solutions with a suitable complexing agent prior to their contacting the anion exchange resin, it is possible to improve the sharpness between the acid-rich and salt-rich fractions.

Wet process phosphoric acid is only one example of numerous types of acidic solutions contaminated with metal salts which may be treated by acid retardation and improved by the present process. Generally, sulfuric acid solutions contaminated with from 0.1 to 5% by weight of iron may be purified by using acid retardation in conjunction with the practices herein described. Similarly nitric acetic acid solutions contaminated with alkaline earth metals, nitric-hydrofluoric acid mixtures contaminated with certain heavy metals may be improved when subjected to acid retardation treatments, as well as many other acidic systems contaminated with any number of metal salts.

Typical acids which are sometimes contaminated with certain undesirable acidic salts include nitric, phosphoric, hydrofluoric, fluoboric, alkylaryl sulfonic, and chromic acid. Troublesome metal salts which frequently contaminate these acids are the salts of iron, aluminum, magnesium, calcium, copper, nickel, vanadium and zinc.

To illustrate the several advantages achieved by practicing acid retardation in combination with a complexing agent, the following is presented by way of example.

*Example I.*—This example was conducted using an ion exchange column made from Pyrex glass fitted with supporting underdrain and flow control means. The glass column was 11/16" diameter and was 47½" long. The bed depth was 45" with the bed volume being 275 milliliters (settled). The available feed head was approximately 25'.

The particular resin used was Nalcite SBR (see U.S. Patent 2,591,573).

Prior to being charged into the column, the resin was converted to the phosphate form by thorough conditioning with analytical grade phosphoric acid. Finally, any unreacted remaining acid was displaced by treatment with deionized water.

Two feed reservoirs for the column were provided, containing demineralized water and the other containing the phosphoric acid solution to be purified. Suitable feed lines and valves were connected to the unit to permit alternate feeding of either the water regenerant or the acid solution to be treated. The feed volumes were selected so that each cycle consisted of alternate waves of 105 ml. of the phosphoric acid and 90 ml. of deionized water. It may be noted at this point that one dose of each of the two solutions constituted one cycle of the process. Each cycle was 7 minutes, which is equivalent to 28 milliliters per minute average flow rate. The column was brought to balanced equilibrium by repeated cycling before any samples were collected for analysis.

The particular acid used was a phosphate rock acid having the following analysis:

| | |
|---|---|
| Free mineral acidity, Normal | 5.2 |
| Specific gravity, wt. percent | 1.273 |
| Phosphate as $PO_4$, wt. percent | 33.6 |
| Sulfate as $SO_4$, wt. percent | 2.23 |
| Calcium as Ca, wt. percent | 0.16 |
| Aluminum as Al, wt. percent | 0.24 |
| Iron as Fe, wt. percent | 0.33 |
| Fluoride as $SiF_6$, wt. percent | 1.75 |
| Color reading in Klett Summerson Colorimeter at 440 millimicrons | 550 |

Twenty-two fractions were collected during the course of the run reported, with each sample being approximately 15 milliliters in volume. Since the major contaminant in starting phosphate solution was iron and the color of the acid proportional to the iron content, analysis was made by means of color comparison. The entire run constituted approximately two cycles. The results of these runs are presented below in Table I.

TABLE I.—PURIFICATION OF WET PROCESS PHOSPHORIC ACID BY ACID RETARDATION, CONVENTIONAL PROCEDURE

| Fraction Number | Acid Normality | Color Reading in Klett Summerson 440 |
|---|---|---|
| 1 | 1.87 | 90 |
| 2 | 1.53 | 155 |
| 3 | 1.56 | 315 |
| 4 | 2.38 | 470 |
| 5 | 3.75 | 380 |
| 6 | 4.45 | 260 |
| 7 | 4.35 | 174 |
| 8 | 4.08 | 109 |
| 9 | 3.51 | 75 |
| 10 | 3.18 | 63 |
| 11 | 2.75 | 60 |
| 12 | 2.57 | 60 |
| 13 | 2.21 | 65 |
| 14 | 1.67 | 82 |
| 15 | 1.58 | 125 |
| 16 | 1.5 | 243 |
| 17 | 1.87 | 430 |
| 18 | 3.2 | 430 |
| 19 | 4.35 | 300 |
| 20 | 4.47 | 206 |
| 21 | 4.13 | 135 |
| 22 | 3.8 | 96 |

*Example II.*—Using the same conditions as above, a second series of cycles was made, with the only change being the addition of two grams of sodium hexametaphosphate per liter of impure acid just prior to beginning of the run. The results of this run are presented below in Table II:

TABLE II.—PURIFICATION OF WET PROCESS PHOSPHORIC ACID BY IMPROVED ACID RETARDATION PROCESS

| Fraction Number | Acid Normality | Klett Summerson Color Reading to 440 Millimicrons |
|---|---|---|
| 1 | 2.58 | 55 |
| 2 | 2.26 | 160 |
| 3 | 2.02 | 335 |
| 4 | 1.69 | 425 |
| 5 | 1.35 | 500 |
| 6 | 1.38 | |
| 7 | | |
| 8 | 3.08 | 405 |
| 9 | 3.63 | 280 |
| 10 | 3.74 | 195 |
| 11 | 3.71 | 130 |
| 12 | 3.55 | 90 |
| 13 | 3.27 | 75 |
| 14 | 3.04 | 104 |
| 15 | 2.77 | 220 |
| 16 | 2.55 | 355 |
| 17 | 2.20 | 450 |
| 18 | 1.52 | 520 |
| 19 | 1.86 | 600 |
| 20 | 2.7 | 525 |
| 21 | 3.48 | 365 |
| 22 | 3.80 | 250 |
| 23 | 3.80 | 180 |
| 24 | 3.63 | 121 |
| 25 | 3.29 | 85 |
| 26 | 3.21 | 73 |

By comparing Tables I and II, it is evident there is a greater separation between the acid-rich and the salt-rich fractions, when the impure acid is pretreated with the condensed phosphate, Table II. Not only is the separation greater, but the acid-lean fraction contains relatively larger portion of the total salt. Thus, there is obtained an acid-rich fraction containing a relatively smaller portion of the total salt. In particular fractions 2–6 in Table II, should be compared with fractions 1–4 in Table I.

The above example clearly shows the higher purity acid recovered by using a complexing agent.

Using the same conditions as above, a third series of cycles was made with the only change being the addition of 4 grams per liter of impure acid, of a hydroxy carboxylic acid complexing agent, sold as "Vodene 400" (The Chemical Sales Corp.). The addition was made just prior to the beginning of the run. The results are presented below in Table III.

TABLE III.—PURIFICATION OF WET PROCESS PHOSPHORIC ACID BY IMPROVED ACID RETARDATION PROCESS USING HYDROXY CARBOXYLIC ACID COMPLEXING AGENT

| Fraction Number | Acid Normality | Klett Summerson Color Reading to 440 Millimicrons |
|---|---|---|
| 1 | 2.72 | 175 |
| 2 | 2.58 | 300 |
| 3 | 2.33 | 415 |
| 4 | 2.2 | 460 |
| 5 | 1.7 | 500 |
| 6 | 1.65 | 560 |
| 7 | 1.7 | 650 |
| 8 | .92 | 460 |
| 9 | 3.42 | 400 |
| 10 | 4.1 | 350 |
| 11 | 4.1 | 340 |
| 12 | 3.74 | 335 |
| 13 | 3.2 | 340 |

By comparing Tables I and III it is evident that Table III shows an improved separation of acid-rich and salt-rich fractions, with an acid-rich fraction containing a relatively smaller portion of the total salt. In particular, fractions 3–8 of Table III, should be compared with fractions 1–4 in Table I.

The invention is restricted to supplementing "acid retardation" only in those cases where the salts dissolved in the highly ionized acids tend to precipitate in "non-acidic media." The expression "non-acidic media," as used herein, means any condition which is less acidic than the orignal starting condition, or any other condition which tends to cause precipitation. Having thus described our invention, it is claimed as follows:

1. In a process for the separation of dissolved salts selected from the group consisting of iron and aluminum salts from solutions of strong acids selected from the group consisting of sulfuric and phosphoric acids by sequentially contacting said solutions with a strong base ion exchange resin converted to the phosphate form when phosphoric acid is to be purified and the sulfate form when sulfuric acid is to be purified, and then with water to regenerate said resin and provide at least one salt-rich, acid-lean fraction, and at least one acid-rich, salt-lean fraction, said salts being characterized as tending to form insoluble precipitates when subjected to non-acidic media, the improvement which comprises contacting said strong base anion exchange resin with the solutions in the presence of a complexing agent selected from the group consisting of hydroxy carboxylic acid complexing agents and condensed phosphates.

2. The process of claim 1 where the complexing agent is added to the solutions just prior to their contacting the strong base anion exchange resin.

3. The process of claim 2 where the amount of complexing agent is at least 100 parts per million of the acid solution.

4. The process of claim 2 where the complexing agent is a condensed phosphate.

5. The process of claim 2 where the strong acid solution is a phosphoric acid solution which contains dissolved therein at least 0.01% by weight of iron.

References Cited by the Examiner

UNITED STATES PATENTS

| 2,830,874 | 4/1958 | Long et al. | 23—18 |
| 3,047,361 | 7/1962 | Hubbard et al. | 23—165 X |
| 3,057,711 | 10/1962 | Reusser et al. | 23—165 X |
| 3,067,007 | 12/1962 | Hatch et al. | 23—165 X |
| 3,076,701 | 2/1963 | Bersworth et al. | 23—165 X |

OSCAR R. VERTIZ, *Primary Examiner.*

MURRAY A. BRINDISI, O. F. CRUTCHFIELD, *Assistant Examiners,*